Patented Sept. 9, 1941

2,255,242

UNITED STATES PATENT OFFICE 2,255,242

WAX SUBSTITUTE

Frank W. Corkery, Crafton, Pa., assignor to Pennsylvania Industrial Chemical Corporation, a corporation of Pennsylvania No Drawing. Application October 15, 1938, Serial No. 235,181

3 Claims. (Cl. 260—23)

This invention relates to a carnauba wax substitute.

Carnauba wax is a material of importation which commands a relatively high price. It has a light color, a melting point of about 83° C., and is composed of approximately 50% saponifiable components and 50% unsaponifiable components. The saponifiable components of the carnauba wax are formed of saturated fatty acids, esterified with high molecular weight alcohols. The wax is an important commodity, and its chief virtue for many uses is dependent upon the hardness coupled with its relatively high melting point, which hardness renders it capable of taking a high polish.

I have found that I may mix a particular sort of coumarone-indene resin with fatty acid glycerides of selected sort to provide an acceptable carnauba wax substitute. Hard coumarone-indene resin as commonly produced commercially is not miscible with fats to form a wax, for the reason that the coumarone-indene resin is not compatible with the fatty acid glycerides to form a homogeneous mixture therewith. I have discovered that the reason for this incompatibility of the coumarone-indene resin with a fatty acid glyceride of relatively high melting point is due to the presence in the resin of an effective content of relatively high polymers of coumarone and indene, and have discovered that by using a coumarone-indene resin in which high polymers are absent, or are present in small proportion, I may form a compatible mixture of a relatively high melting coumarone-indene resin with fats, the melting point of which is also reasonably high.

In producing an acceptable carnauba wax substitute comprising a homogeneous mixture of coumarone-indene resin and fat, it must be borne in mind that the product must have a melting point comparable to that of carnauba wax. In mixing fat and coumarone-indene resin to produce the waxy product, it is, therefore, necessary to use both a resin and a fat of relatively high melting point while providing compatibility between the fat and the resin. Also the proportion of resin to fat in the mixture must not be excessive to a stage at which the product is deficient in wax qualities. There is thus relationship between the melting point of the fat, the melting point of the coumarone-indene resin, and the proportioning of fat and resin in the product. These relationships must all be reconciled with the qualities of the resin which render it compatible with the fat.

As illustrative of my invention, I may take stearin, having a melting point of about 60° C., and melt it in equal proportions by weight with coumarone-indene resin of selected sort, having a melting point of about 115° C. (ball and ring method). This simple commingling, if the resin be free of a substantial content of high polymers, gives a high melting wax having the appearance, approximate melting point, and working qualities of carnauba wax. The resin used in this example is a coumarone-indene resin containing a negligible content of polymers in higher than the 6th stage of polymerization. Its relatively high melting point results from the fact that it comprises a relatively small content of the lowest polymers, that is dimers and trimers of coumarone and indene. Such resin is compatible with a fat having of itself a relatively high melting point, while being of a nature to give a waxy compound melting higher than the fat.

I have also made a substantially equivalent carnauba wax substitute by similarly mixing palmitin, having a melting point of about 40° C. with a coumarone-indene resin of about 135° C. melting point (ball and ring method) in the proportion of about 45% fat and 55% resin; and have similarly made a substantially equivalent carnauba wax substitute by melting and mixing fatty acid glycerides hydrogenated to a melting point higher than 20° C. with low-polymer coumarone-indene resin having a melting point of about 125° C. (ball and ring method). Naturally a mixture of fats may be used, if the mixture has an adequately high melting point.

In these latter examples also the coumarone-indene resin contains a negligible percentage of polymers in stages of polymerization higher than the sixth stage. Otherwise to express the composition of the resin, it should be a coumarone-indene resin completely soluble in the aliphatic solvent known as "mineral spirits" at normal room temperature, and deriving an adequately high melting point for its purpose from a compensating low content of dimers and trimers of coumarone and indene.

To set the limits within which an acceptable carnauba wax substitute may be made, the coumarone-indene resin should be completely soluble in mineral spirits at normal room temperature, and should have a melting point higher than 100° C. (ball and ring method); the fat should have a melting point higher than 20° C.; and the proportion of fat and resin should be within the approximate range of 40% to 60%, both ways.

My preferred wax contains stearin as its fatty acid component, because of the high melting point of that fat, and contains more than 50% of the fat, with a content of the low-polymer coumarone-indene resin having a melting point as high as 120° C. (ball and ring method). It will be clear that, within permissible limits, the proportion of the resin, and its melting point, are desirably increased if the melting point of the fat be lower than that of stearin.

It has been noted that the resin should be wholly soluble in mineral spirits, and that it conversely should contain a limited quantity of dimers and trimers of coumarone and indene. It is thus possible to provide a resin having proper qualities for inclusion in the carnauba wax substitute by solvent separation in mineral spirits at about normal room temperature, followed by distillation for recovery of the dissolved resin and removal of the lowest polymers; or equivalently by separation in another aliphatic solvent at a temperature apportioned to its solvent power for coumarone-indene resin as compared with the solvent power of mineral spirits, followed similarly by distillation. It is economical initially to make by polymerization a coumarone-indene resin which is soluble in mineral spirits, and which, therefore, does not require the employment of a solvent separation step in preparation for its use in the carnauba wax substitute.

It will be readily understood that the carnauba wax substitute made in accordance with my invention has effectively the fatty acid content of natural carnauba wax, but replaces the other naturally contained components of carnauba wax with a coumarone-indene resin selected in accordance with my discovery that a relatively high melting coumarone-indene resin, having a minimized content of higher polymers, is compatible with the fatty acid to give the wax substitute.

I claim as my invention:

1. An artificial wax consisting essentially of a fat having a melting point higher than 20° C. and coumarone-indene resin having a melting point higher than 100° C. and completely soluble in mineral spirits at normal room temperature, the fat and the coumarone-indene resin being included within the approximate reciprocal ratio of 2:3 parts of one with 3:2 parts of the other.

2. An artificial wax consisting essentially of stearin melting about 60° C. and coumarone-indene resin melting about 115° C. and completely soluble in mineral spirits at normal room temperature, the stearin and the coumarone-indene resin being included in approximately equal quantities.

3. An artificial wax consisting essentially of palmitin melting about 40° C. and coumarone-indene resin melting about 135° C. and completely soluble in mineral spirits at normal room temperature, the palmitin and the coumarone-indene resin being included in the approximate proportion of 45% of the palmitin and 55% of the coumarone-indene resin.

FRANK W. CORKERY.